W. E. S. WHITMAN.
Improvement in Brooms.
No. 116,126.                  Patented June 20, 1871.
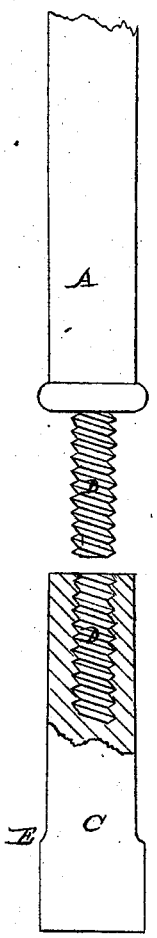
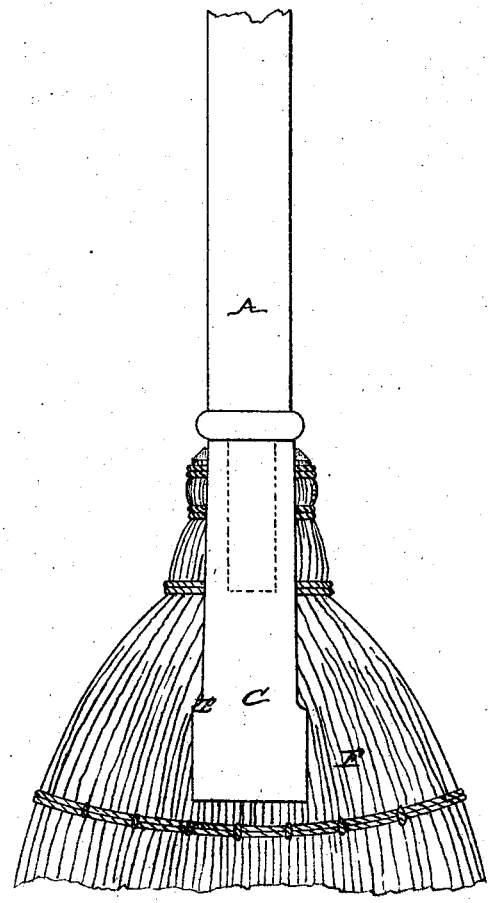

UNITED STATES PATENT OFFICE.

WILLIAM E. S. WHITMAN, OF AUGUSTA, MAINE.

IMPROVEMENT IN BROOMS.

Specification forming part of Letters Patent No. 116,126, dated June 20, 1871.

*To all whom it may concern:*

Be it known that I, WILLIAM E. S. WHITMAN, of the city of Augusta, in the county of Kennebec and State of Maine, have invented a new and useful Improvement in Brooms; and I do hereby declare the following to be a full, clear, and exact description thereof, reference being had to the accompanying drawing, in which—

Figure 1 is a side view of the handle, showing the screw and the threaded aperture to receive the same; and Fig. 2 is a side view of broom and handle, part of the broom being broken out to show the manner of inserting the handle.

Hitherto the handles of corn brooms and those of similar material or structure have become useless, owing to the manner of their attachment, immediately upon the wearing out of the broom. The purpose of my invention is to provide such a way or mode of attachment that the handle of a broom may not be rendered useless when the broom is worn out, but can be used upon other brooms, at pleasure.

The handle is made in two parts, as shown in Fig. 1. The upper part or handle proper is provided at its lower end with a screw. (See B, Fig. 1.) The lower portion C of the handle is provided at its lower end with the usual shoulders E E to prevent its being drawn from the broom, and has at its upper end the threaded aperture D to receive the screw B. This socket C is inserted into the broom when manufactured, as shown in Fig. 2. Upon the broom's becoming worn out the handle A is removed from the socket and inserted into the new broom. In addition to the greater ecomomy resulting from this mode of manufacture, there is also much more ease and convenience in transportation.

What I claim as my invention, and desire to secure by Letters Patent of the United States, is—

The method of manufacturing a broom, as herein shown, combining the handle A, screw B, the socket C having the threaded aperture D and shoulder E, and the broom F, substantially as described, for the purposes set forth.

WILLIAM E. S. WHITMAN.

Witnesses:
HARRISON BAKER,
JOHN W. FREESE.